United States Patent
O'Sullivan et al.

(10) Patent No.: US 9,009,237 B2
(45) Date of Patent: Apr. 14, 2015

(54) PROPAGATING INSTANT MESSAGE STATUS CHANGE

(75) Inventors: Patrick Joseph O'Sullivan, Dublin (IE); Barry E. Willner, Briarcliff Manor, NY (US); Liam Harpur, Dublin (IE); Edith Helen Stern, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 12/827,041

(22) Filed: Jun. 30, 2010

(65) Prior Publication Data

US 2012/0005277 A1    Jan. 5, 2012

(51) Int. Cl.
*G06F 15/16* (2006.01)
*H04L 12/58* (2006.01)

(52) U.S. Cl.
CPC ............ *H04L 12/5815* (2013.01); *H04L 12/58* (2013.01); *H04L 51/043* (2013.01)

(58) Field of Classification Search
CPC .... G06Q 10/107; H04L 12/585; H04L 12/58; H04L 12/5815; H04L 51/043
See application file for complete search history.

(56) References Cited

U.S. PATENT DOCUMENTS

| | | | |
|---|---|---|---|
| 4,001,785 A | 1/1977 | Miyazaki et al. | |
| 5,283,868 A | 2/1994 | Baker et al. | |
| 6,301,609 B1* | 10/2001 | Aravamudan et al. | 709/207 |
| 2008/0005325 A1* | 1/2008 | Wynn et al. | 709/225 |
| 2009/0083827 A1 | 3/2009 | Denner et al. | |
| 2009/0113342 A1* | 4/2009 | Bank et al. | 715/808 |
| 2009/0210497 A1* | 8/2009 | Callanan et al. | 709/206 |
| 2010/0008356 A1 | 1/2010 | Boni et al. | |

* cited by examiner

*Primary Examiner* — Jude Jean Gilles
*Assistant Examiner* — Jaren M Means
(74) *Attorney, Agent, or Firm* — Holland & Knight LLP; Brian J. Colandreo, Esq.; Jeffrey T. Placker, Esq.

(57) ABSTRACT

A method and computer program product for propagating instant message status change is described. A method may comprise receiving, via at least one of a client electronic device and a server computer, an instant message request associated with an instant message request target. The method may further comprise determining, via at least one of the client electronic device and the server computer, an instant message status based upon, at least in part, the instant message request and the instant message request target. The method may also comprise in response to the determination, providing, via at least one of the client electronic device and the server computer, an indication of the instant message status.

16 Claims, 4 Drawing Sheets

PROPAGATING INSTANT MESSAGE STATUS CHANGE

BACKGROUND OF THE INVENTION

Individuals may have IM conversations and/or chats with multiple individuals simultaneously. An individual's manager may need to speak with the individual via IM, or another form of communication, about an important situation. While the manager may attempt to communicate with the individual, the individual may be distracted by many other IM windows that may be open.

BRIEF SUMMARY OF THE INVENTION

In a first embodiment, a method may comprise, receiving, via at least one of a client electronic device and a server computer, an instant message request associated with an instant message request target. The method may further comprise determining, via at least one of the client electronic device and the server computer, an instant message status based upon, at least in part, the instant message request and the instant message request target. The method may also comprise, in response to the determination, providing, via at least one of the client electronic device and the server computer, an indication of the instant message status.

One or more of the following features may be included. In response to the determination, at least one of instant message access, voice access, telephone access, email access, and web access associated with the instant message request target may be restricted to an instant message request initiator. The instant message status may indicate that an instant message user has been de-prioritized. Determining the instant message status may be based upon, at least in part, at least one of an organizational hierarchy, a social network, a predefined relationship, a predefined policy, and a weighting determination. At least one of the instant message access, the voice access, the telephone access, the email access, and the web access may be restricted for a configurable amount of time.

In some implementations, the method may further comprise overriding the restriction based upon, at least in part, a relative position of an instant message user to the instant message request target. Existing communication access to the instant message request target may be restricted after a configurable amount of time. In response to the determination, new communication attempts may be blocked with the instant message request target for a configurable amount of time. The indication of the instant message status may include a notification that existing communication access to the instant message request target may be reinstated in a configurable amount of time. The instant message request target may be allowed to approve the restriction.

In second embodiment, a computer program product may reside on a computer readable storage medium and may have a plurality of instructions stored on it. When executed by a processor, the instructions may cause the processor to perform operations comprising receiving an instant message request associated with an instant message request target. The operations may further comprise determining an instant message status based upon, at least in part, the instant message request and the instant message request target. The operations may also comprise, in response to the determination, providing an indication of the instant message status.

One or more of the following features may be included. In response to the determination, at least one of instant message access, voice access, telephone access, email access, and web access associated with the instant message request target may be restricted to an instant message request initiator. The instant message status may indicate that an instant message user has been de-prioritized. Determining the instant message status may be based upon, at least in part, at least one of an organizational hierarchy, a social network, a predefined relationship, a predefined policy, and a weighting determination. At least one of the instant message access, the voice access, the telephone access, the email access, and the web access may be restricted for a configurable amount of time.

In some implementations, the operations may further comprise overriding the restriction based upon, at least in part, a relative position of an instant message user to the instant message request target. Existing communication access to the instant message request target may be restricted after a configurable amount of time. In response to the determination, new communication attempts may be blocked with the instant message request target for a configurable amount of time. The indication of the instant message status may include a notification that existing communication access to the instant message request target may be reinstated in a configurable amount of time. The instant message request target may be allowed to approve the restriction.

The details of one or more implementations are set forth in the accompanying drawings and the description below. Other features and advantages will become apparent from the description, the drawings, and the claims.

DETAILED DESCRIPTION OF THE INVENTION

Figure 1:
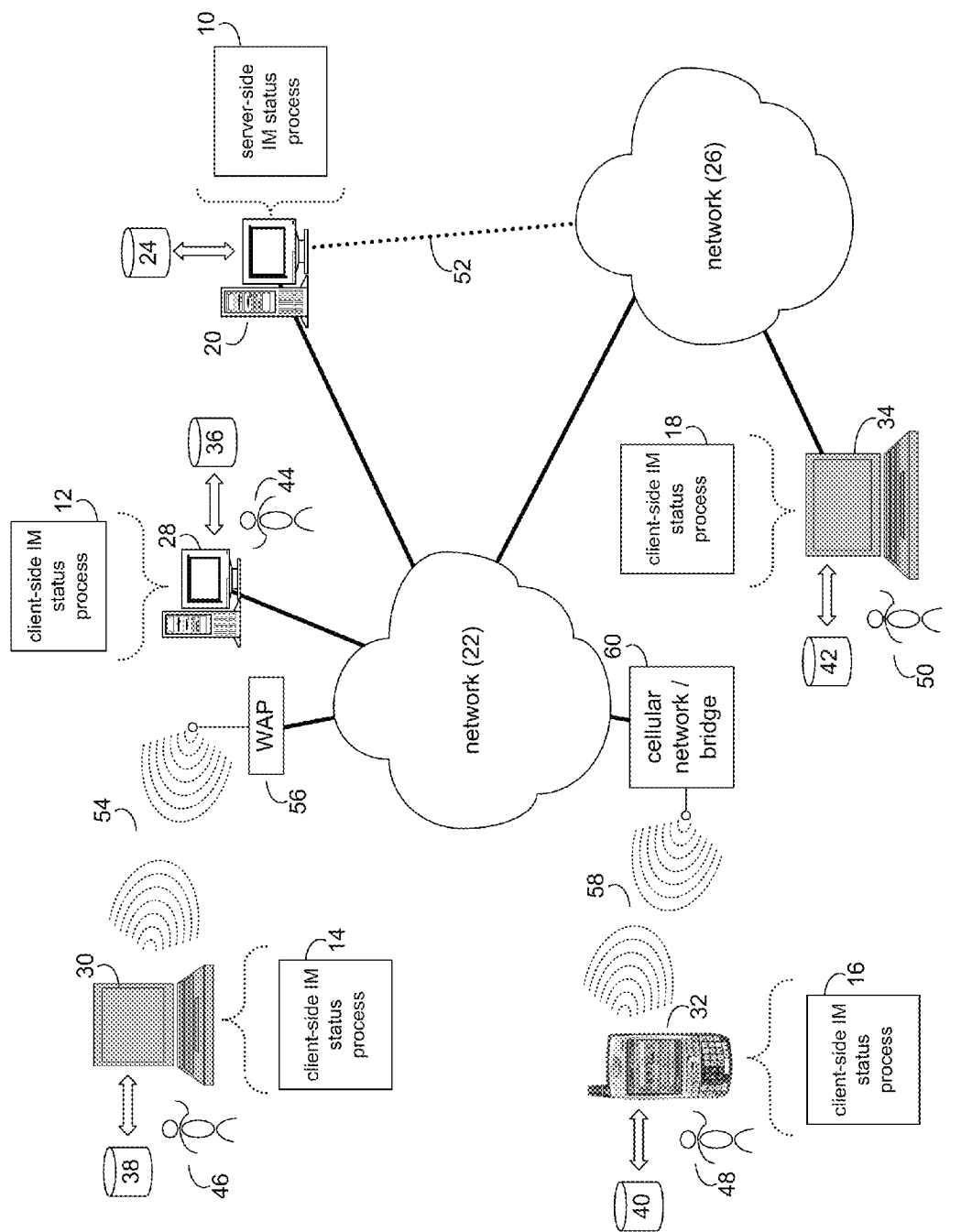
FIG. 1 is a diagrammatic view of an IM status process coupled to a distributed computing network.
Figure 2:
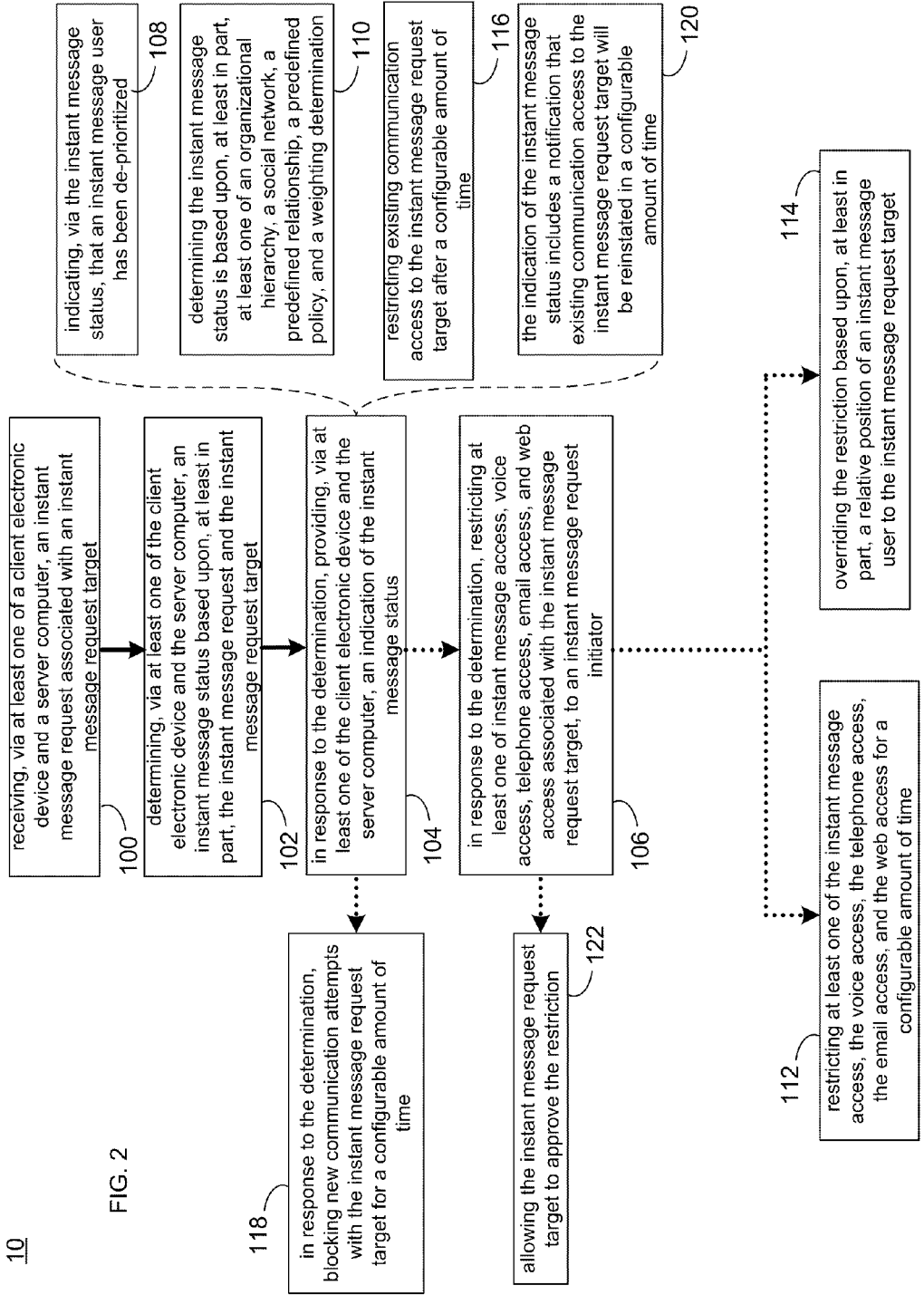
FIG. 2 is a flowchart of the IM status process of FIG. 1.

Referring to FIGS. 1 & 2, there is shown an instant message status process 10. As will be discussed below, IM status process 10 may receive 100 an instant message request associated with an instant message request target. Instant message status process 10 may further determine 102 an instant message status based upon, at least in part, the instant message request and the instant message request target.

The instant message status (IMS) process may be a server-side process (e.g., server-side IMS process 10), a client-side process (e.g., client-side IMS process 12, client-side IMS process 14, client-side IMS process 16, or client-side IMS process 18), or a hybrid server-side/client-side process (e.g., the combination of server-side IMS process 10 and one or more of client-side IMS processes 12, 14, 16, 18).

Server-side IMS process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell® Netware®; or Red Hat® Linux®, for example.

The instruction sets and subroutines of server-side IMS process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side IMS processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CE®, Red Hat® Linux®, or a custom operating system.

The instruction sets and subroutines of client-side IMS processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side IMS processes 12, 14, 16, 18 and/or server-side IMS process 10 may be processes that run within (i.e., are part of) a group chat and/or instant messaging application. Alternatively, client-side IMS processes 12, 14, 16, 18 and/or server-side IMS process 10 may be stand-alone applications that work in conjunction with the group chat and/or instant messaging application. One or more of client-side IMS processes 12, 14, 16, 18 and server-side IMS process 10 may interface with each other (via network 22 and/or network 26) to allow a plurality of users (e.g., users 44, 46, 48, 50) to share information. In one implementation client-side IMS processes 12, 14, 16, 18 and/or server-side IMS process 10 may be processes that run within or in connection with a unified communications and collaboration application, including but not limited to Lotus® Sametime®.

Users 44, 46, 48, 50 may access server-side IMS process 10 directly through the device on which the client-side IMS process (e.g., client-side IMS processes 12, 14, 16, 18) is executed, namely client electronic devices 28, 30, 32, 34, for example. Users 44, 46, 48, 50 may access server-side IMS process 10 directly through network 22 and/or through secondary network 26. Further, server computer 20 (i.e., the computer that executes server-side IMS process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Instant Message Status Process

IMS process 10 may allow an instant message user to initiate an exclusive IM conversation with another instant message user. Further, IM process 10 may provide and/or propagate an IM status, which may notify other users of the exclusive conversation. For the following discussion, server-side IMS process 10 will be described for illustrative purposes. Client-side IMS process 12 may be incorporated into server-side IMS process 10 and may be executed within one or more applications that allow for communication with client-side IMS process 12. However, this is not intended to be a limitation of this disclosure, as other configurations are possible (e.g., stand-alone, client-side IMS processes and/or stand-alone server-side IMS processes.) For example, some implementations may include one or more of client-side IMS processes 14, 16, 18 in place of or in addition to client-side IMS process 12.

Figure 3:
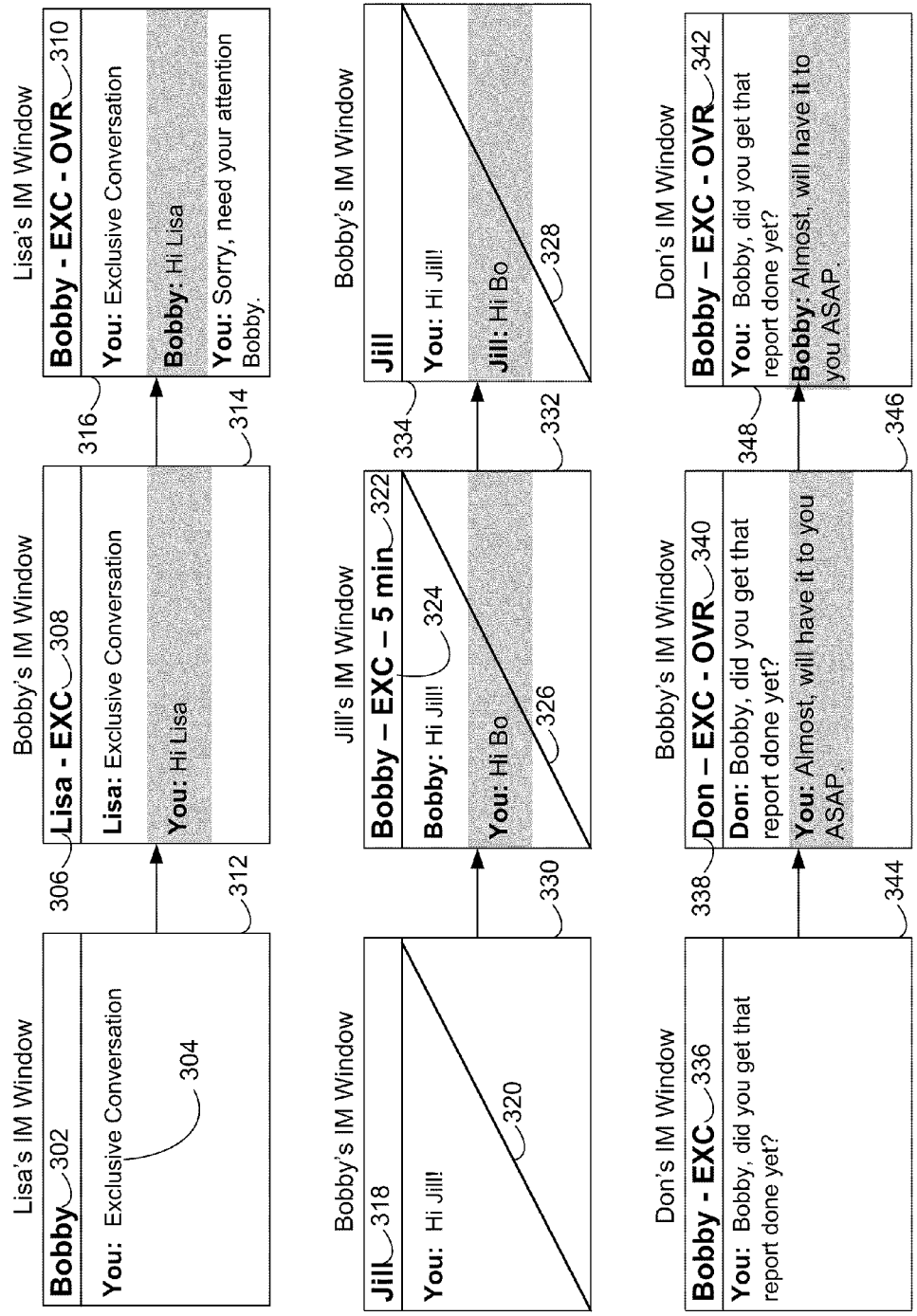
FIG. 3 is an instant message flow which may be associated with the IM status process of FIG. 1.

Referring now to FIGS. 1-4, IMS process 10 may receive 100 an IM request (e.g., IM request 304) associated with an IM request target (e.g., IM request target 302). As shown in FIG. 3, IM request 304 may be sent via instant message (IM). IM request 304 may be sent from a first IM user (e.g., IM request initiator 306) to a second IM user (e.g., IM request target 302), via an IM application. For exemplary purposes only and without limitation, IM request target 302 may be Bobby, as shown in FIG. 3, and IM request initiator 306 may be Lisa, as shown in FIG. 3. IMS process 10 may show various IM usernames in IM windows (e.g., IM windows 312 and 314). IMS process 10 may parse each IM sent in order to find an IM request (e.g., IM request 304). While IM request 304 is shown in FIG. 3 as being typed and sent via IM, other configurations are possible. For example an IM application may include a separate feature for sending IM request 304, such as a button which, when selected, sends IM request 304.

If IMS process 10 finds that an IM request (e.g., IM request 304) has been made, IMS process 10 may determine 102 an IM status (e.g., IM status 308) based upon, at least in part, IM request 304 and IM request target 302. While IM request 304 is shown as being displayed in IM windows 312, 314, and 316, IM request 304 may not always be displayed in the IM window of the IM request target (e.g., IM request target 302). IMS process 10 may, in response to the determination, provide 104 an indication of the IM status (e.g., IM statuses 308, 310, 322, 336, 340, and 342), which will be further explained below. While indications of IM statuses are shown in FIG. 3 as being numbers and/or words, other configurations are possible. For example, IMS process 10 may display one or symbols in an IM window (e.g., IM windows 312, 314, 316, 330, 332, 334, 344, 346, and 348) that may represent various IM statuses. As shown in FIG. 3, one form of an IM status may also be IM statuses 320, 326, and 328, shown as diagonal lines across IM windows 330, 332, and 334, respectively. IM statuses 320, 326, and 328 may indicate that an IM user (e.g., IM user 318 shown as Jill) is prevented from entering and/or sending text in the corresponding IM window (e.g., IM window 332).

In response to the determination (102), at least one of instant message access, voice access, telephone access, email access, and web access associated with IM request target 302 may be restricted 106 to IM request initiator 306. For example, IM request initiator 306 (shown as Lisa in FIG. 3) may send IM request 304 to IM request target 302 (shown as Bobby in FIG. 3). IMS process 10 may determine that IM request 304 (shown in FIG. 3 as "Exclusive Conversation") sent via IM window 312 is a request to restrict IM access with the IM request target (e.g., Bobby) to the IM request initiator (e.g., Lisa). As such, IMS process 10 may grant exclusive IM access for IM request target 302 (e.g., Bobby) to IM request initiator 306 (e.g., Lisa). IMS process 10 may de-prioritize other IM users that may try to communicate with IM request target 302.

IMS process 10 may further indicate 108, via IM status 324, that an IM user (e.g., IM user 318, shown in FIG. 3 as Jill) has been de-prioritized. For example, IM status 324, shown in FIG. 3 as "EXC", may indicate to IM user 318 (e.g., Jill) that IM access to IM request target 302 (e.g., Bobby) has been restricted. "EXC" as shown in Jill's IM window may indicate to Jill that another user (e.g., IM request initiator 306) has initiated an exclusive conversation with Bobby, and that Jill's IM access to Bobby has been de-prioritized. Further IM status 326 (shown in IM window 332 as a line across IM window 332), may indicate to Jill that another user has initiated an exclusive conversation with Bobby. IMS process 10 may also prevent an IM user (e.g., Jill) from sending an IM to an IM request target (e.g., Bobby).

Figure 4:
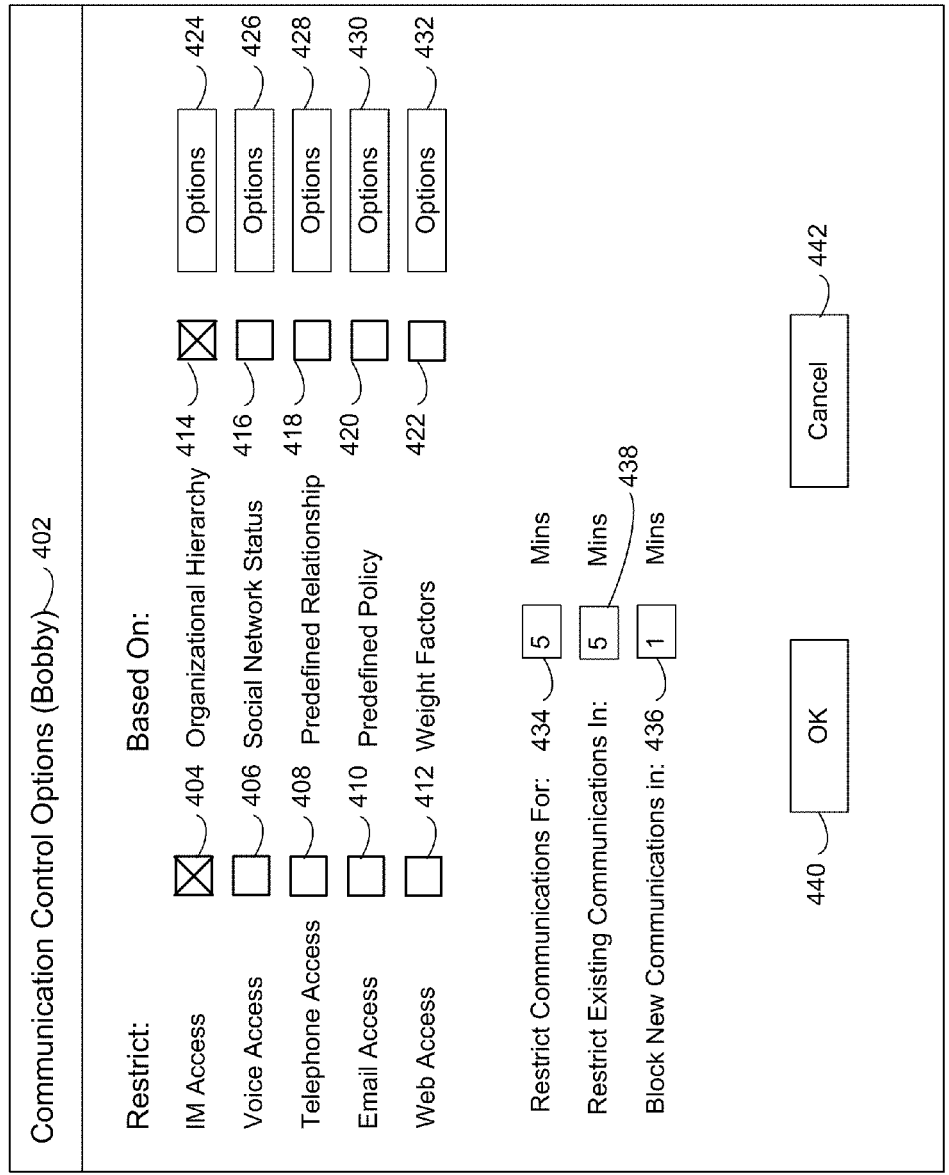
FIG. 4 is popup window that may be associated with the IM status process of FIG. 1.

Determining (110) IM status 324 may be based upon, at least in part, at least one of an organizational hierarchy, a social network, a predefined relationship, a predefined policy, and a weighting determination. An organizational hierarchy may be a corporate directory, for example, and may be based upon a defined data structure. IMS process 10 may also use a Lightweight Directory Access Protocol (LDAP) to determine IM status 324. Referring now to FIG. 4, an IM request initiator (e.g., IM request initiator 306) may access a communication control options popup window (e.g., popup window 400) for an IM request target (e.g., IM request target 402 shown in popup window 400 as Bobby). IMS process 10 may render popup window 400. IM request initiator 306 may select one or more of an organizational hierarchy, a social network, a predefined relationship, a predefined policy, and a weight factor determination for determining how to handle communications (e.g., incoming IM's) to the IM request target during an exclusive conversation. IM request initiator 306 may also select one or more of instant message access, voice access, telephone access, email access, and web access via popup window 400. Upon selection of one or more communication access channels (e.g., instant message access, voice access, telephone access, email access, and web access), IMS process 10 may restrict IM users from communicating with IM request target 302 via the one or more selected communication access channels.

IM request initiator 306 may select one or more of check boxes 404, 406, 408, 410, and 412 corresponding to one or more of instant message access, voice access, telephone access, email access, and web access. In one example, a unified communications and collaboration application may control all communication access to an IM user. IMS process 10 may control all communication access to the IM user and may restrict communication access to the IM user based upon one or more selected checkboxes in popup window 400 (e.g., checkboxes 404, 406, 408, 410, and 412). If, for example, one or more of checkboxes 406 and/or 408 (e.g., corresponding to voice access and telephone access, respectively) is selected, IMS process 10 may provide a busy signal when a user is attempting to reach IM request target 302 by voice access (e.g., PSTN, PBX, and/or VOIP) or telephone during an exclusive conversation. Further, IMS process 10 may block any indication (e.g., ringing and/or call waiting) to IM request target 302 that any voice and/or telephone communication with IM request target 302 is being attempted. Similarly, if one or more of checkboxes 410 and/or 412 (e.g., corresponding to email access and/or web access, respectively) is selected, IMS process 10 may deny a user attempting to reach IM request target 302 by email access or web access (e.g., web conference). Further, based upon an IM status determination made by IMS process 10 corresponding to a user attempting to communicate with IM request target 302 via voice access, telephone access, email access, and/or web access, IMS process 10 may allow the user to have communication access to the IM request target. The determination may be made based upon at least one of an organizational hierarchy, a social network, a predefined relationship, a predefined policy, and/or a weight factor determination Further, IM request initiator 306 may select one or more of check boxes 414, 416, 418, 420, and 422 corresponding to an organizational hierarchy, a social network, a predefined relationship, a predefined policy, and a weight factor determination. Additionally, IM request initiator 306 may select one or more of option buttons 424, 426, 428, 430, and 432, corresponding to an organizational hierarchy, a social network, a predefined relationship, a predefined policy, and a weight factor determination. After selecting one or more of option buttons 424, 426, 428, 430, and 432, IM request initiator 306 may configure organizational hierarchy, social network, predefined relationship, predefined policy, and weight factor determination settings for use by IMS process 10 in determining the IM status (e.g., IM status 324). For example, IM request initiator 306 may select a proximity range between IM users in the organizational hierarchy and/or social network. The proximity range may be used by IMS process 10 to determine IM status 324. In another example, IM request initiator 306 may define a predefined relationship and/or a predefined policy with one or more IM users, which may also be used by IMS process 10 to determine IM status 324.

At least one of instant message access, voice access, telephone access, email access, and web access may be restricted 112 for a configurable amount of time (shown in field 434 as 5 Mins) by IMS process 10. IM request initiator 306 may enter a configurable amount of time in field 434 of popup window 400. Referring back to FIG. 3, the configurable amount of time (e.g., 5 Mins) may be displayed via an IM status (e.g., IM status 322 shown in IM window 332 as "5 min"). IM request initiator 306 may also enter a configurable amount of time in field 436 and/or 438 of popup window 400, which will be further explained below.

Additionally, IMS process 10 may override 114 the restriction (e.g., (112)) based upon, at least in part, a relative position of an IM user (e.g., IM user 338) to the instant message request target (e.g., IM request target 302). For example, and as shown in FIG. 3, IM user 338 (e.g., Don) may attempt to communicate with IM request target 302 (e.g., Bobby) while IM request initiator 306 (e.g., Lisa) is having an exclusive conversation with IM request target 302 (e.g., Bobby). Assume for example that Don is a vice president, Lisa is a manager, and Bobby and Jill are their associates in an organization and/or corporation. As such, Don may have the highest relative position, Lisa may have the second highest relative position, and Bobby and Jill may have the lowest relative positions. Further, their positions may be based upon an organizational hierarchy of the company they may work for. Lisa may request an exclusive conversation with Bobby and IMS process 10 may restrict all other communications (e.g., IM communications) with Bobby. Jill may then try to communicate (e.g., via IM) with Bobby, but may be de-prioritized by IMS process 10 (shown by, e.g., IM status 324). Further, IM status 326, shown as a diagonal line, may also indicate to Jill that she has been de-prioritized. IM status 326, shown on IM window 332, may prevent Jill from sending IM's to Bobby during an exclusive conversation. Don may then try to communicate with Bobby and, based upon, at least in part, his relative position to Bobby and/or Lisa, IMS process 10 may override 114 the access restriction and/or exclusive conversation. IMS process 10 may further provide IM statuses 310, 340 and/or 342 (shown as "OVR") in IM windows 316, 346 and/or 348, which may provide an indication of the override.

In another example, Lisa may wish to have an exclusive conversation with Bobby, but may not want to interrupt an exclusive conversation that Bobby may already be having with another IM user. Lisa may send Bobby a gesture text, which may indicate that Lisa wishes to have an exclusive conversation with Bobby. In this example, IM request 304 may be a gesture text. Lisa may send the gesture text (e.g., "exclusive conversation") to Bobby, which may let Bobby know that Lisa is looking for an exclusive conversation. Bobby may then accept the gesture text (via, e.g., an accept button, not shown), which may then be propagated to other IM users to provide notification that Bobby is in an exclusive conversation with Lisa. Further, Bobby may reject the gesture text. For example, Bobby may be having an exclusive conversation with someone more important than Lisa, and may reject the gesture text and indicate to Lisa that he is already in an exclusive conversation. Alternatively, and as discussed above, IMS process 10 may provide an indication similar to IM status 320 on Lisa's IM window corresponding to Bobby, indicating to Lisa that Bobby is already in an exclusive conversation.

As discussed above, the determination of IM status 324 made by IMS process 10 may be based upon the relative positions of IM users in one or more of an organizational hierarchy, corporate directory, and/or LDAP. Further the determination (102) may be based upon a proximity of one IM user to another IM user in a social network. For example, a social network graph for an IM request target may include the proximity of other IM users as compared to each other from the perspective of the IM request target. The determination (102) may also be based upon a predefined relationship between one or more IM users. For example, Bobby and Jill may have a predefined trust relationship that may allow them to initiate exclusive conversations with each other. The predefined relationship may also allow Bobby or Jill to override an exclusive conversation that one of them may be having with another IM user. The predefined relationship may be defined by Bobby or Jill in popup window 400, or a similar popup window rendered by IMS process 10. Bobby or Jill may select an options button (e.g., options button 428) to define the predefined relationship. Moreover, the determination may be based upon a predefined policy. For example, Lisa may be a sales person and may be about to land a large contract and Bobby may be helping her. Based upon a predefined policy, Lisa may be allowed to have exclusive conversations with Bobby independent of her position in the organizational hierarchy. The predefined policy may be set by selecting options button 430 in popup window 400. Additionally, the determination may be based upon one or more weight factors. The weight factors may place a relative importance on one or more of the organizational hierarchy, social network status, predefined relationship, and predefined policy. The weight factors may be defined by an IM user in popup window 400 by selecting options button 432.

Referring back to FIG. 4, existing communication access to IM request target 302 (e.g., Bobby) may be restricted 116 by IMS process 10 after a configurable amount of time. IM request initiator 306 may enter a configurable amount of time in field 438 of popup window 400 (e.g., "5 Mins", as shown in FIG. 4). IMS process 10 may then restrict existing communications (e.g., IM access) to IM request target 302 after 5 minutes. For example, IM request initiator 306 may select OK button 440 in order to accept the communication control options in popup window 400. IMS process 10 may restrict (e.g., block) existing communications to IM request target 302 (e.g., 5 minutes after receiving an IM request).

Further, in response to the determination (102) of an IM status by IMS process 10, new communication attempts may be blocked 118 with IM request target 302 for a configurable amount of time. IM request initiator 306 may enter a configurable amount of time in field 436 of popup window 400 (e.g., "1 Min", as shown in FIG. 4). IMS process 10 may then block new communication attempts with IM request target 302 after 1 minute. For example, IM request initiator 306 may select OK button 440 in order to accept the communication control options in popup window 400. IMS process 10 may block new communication attempts with IM request target 302 (e.g., 1 minute after receiving an IM request).

Referring back to FIG. 3, the indication of an IM status may include a notification (120) that existing communication access to IM request target 302 may be reinstated in a configurable amount of time (e.g., 5 minutes). For example, if IM request initiator 306 accepts the communication control options shown in popup window 400, communication access (e.g., IM access) may be restricted for 5 minutes. IMS process 10 may include IM status 322 (e.g., 5 min), which may notify an IM user (e.g., Jill) that communication access (e.g., IM access) with the IM request target (e.g., IM request target 302) may be reinstated in 5 minutes.

In one embodiment, IMS process 10 may allow 122 the IM request target (e.g., IM request target 302) to approve the restriction. For example, if IM request initiator 306 accepts the communication control options shown in popup window 400 by selecting OK button 440, IMS process 10 may prompt IM request target 302 to approve the one or more communication access restrictions selected by IM request initiator 306. Further, IM request initiator 306 may select Cancel button 442 and may avoid accepting the communication control options in popup window 400.

While examples have been provided above for exclusive communication access with an IM request target after an IM request has been made, other configurations are possible. For example, a request similar to an IM request (e.g., IM request 304) may be made via one or more of the other communication access channels discussed, including but not limited to, voice, telephone, email, and/or web. Based upon a determination of a status similar to the IM status discussed above, IMS process 10 may selectively block or allow communication attempts with the target user. This process may be achieved through customization, personalization, rules, templates, and/or through setting priorities, similar to the communication control options provided in popup window 400.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium (s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:
receiving, via at least one of a client electronic device and a server computer, an instant message request from a first user associated with an instant message request target of a second user;
determining, via at least one of the client electronic device and the server computer, an instant message status based upon, at least in part, the instant message request of the first user and the instant message request target of the second user;
restricting at least one of instant message access, voice access, telephone access, email access, and web access associated with the instant message request target, to the instant message request initiator based on a determination that the instant message request sent from the first user to the second user is a request for exclusivity between the first user and the second user; and
in response to the determination, providing, via at least one of the client electronic device and the server computer, an indication of the instant message status;
wherein determining the instant message status is based upon, at least in part, at least one of an organizational hierarchy, a social network, a predefined relationship, a predefined policy, and a weighting determination.

2. The method of claim 1, further comprising:
indicating, via the instant message status, that an instant message user has been de-prioritized.

3. The method of claim 1, further comprising:
restricting at least one of the instant message access, the voice access, the telephone access, the email access, and the web access for a configurable amount of time.

4. The method of claim 1, further comprising:
overriding the restriction based upon, at least in part, a relative position of an instant message user to the instant message request target.

5. The method of claim 1, further comprising:
restricting existing communication access to the instant message request target after a configurable amount of time.

6. The method of claim 1, further comprising:
in response to the determination, blocking new communication attempts with the instant message request target for a configurable amount of time.

7. The method of claim 1, wherein the indication of the instant message status includes a notification that existing communication access to the instant message request target will be reinstated in a configurable amount of time.

8. The method of claim 1, further comprising:
allowing the instant message request target to approve the restriction.

9. A computer program product residing on a non-transitory computer readable storage medium having a plurality of instructions stored thereon, which, when executed by a processor, cause the processor to perform operations comprising:
receiving an instant message request from a first user associated with an instant message request target of a second user;
determining an instant message status based upon, at least in part, the instant message request of the first user and the instant message request target of the second user;
restricting at least one of instant message access, voice access, telephone access, email access, and web access associated with the instant message request target, to the instant message request initiator based on a determination that the instant message request sent from the first user to the second user is a request for exclusivity between the first user and the second user; and
in response to the determination, providing an indication of the instant message status;
wherein determining the instant message status is based upon, at least in part, at least one of an organizational hierarchy, a social network, a predefined relationship, a predefined policy, and a weighting determination.

10. The computer program product of claim 9, further comprising instructions for:
indicating, via the instant message status, that an instant message user has been de-prioritized.

11. The computer program product of claim 9, further comprising instructions for:
restricting at least one of the instant message access, the voice access, the telephone access, the email access, and the web access for a configurable amount of time.

12. The computer program product of claim 9, further comprising instructions for:
overriding the restriction based upon, at least in part, a relative position of an instant message user to the instant message request target.

13. The computer program product of claim 9, further comprising instructions for:
restricting existing communication access to the instant message request target after a configurable amount of time.

14. The computer program product of claim 9, further comprising instructions for:
in response to the determination, blocking new communication attempts with the instant message request target for a configurable amount of time.

15. The computer program product of claim 9, wherein the indication of the instant message status includes a notification that existing communication access to the instant message request target will be reinstated in a configurable amount of time.

16. The computer program product of claim 9, further comprising instructions for:
allowing the instant message request target to approve the restriction.

* * * * *